United States Patent [19]

Levine

[11] Patent Number: 4,739,495

[45] Date of Patent: Apr. 19, 1988

[54] SOLID-STATE IMAGER DEFECT CORRECTOR

[75] Inventor: Peter A. Levine, Mercer County, N.J.

[73] Assignee: RCA Corporation, Princeton, N.J.

[21] Appl. No.: 779,862

[22] Filed: Sep. 25, 1985

[51] Int. Cl.[4] .................. G06F 15/68; H04N 5/21; H04N 5/217

[52] U.S. Cl. .................. 364/571; 358/163; 358/213.15; 358/213.17; 364/521

[58] Field of Search ............... 364/571, 521; 358/163, 358/167, 212, 213

[56] References Cited

U.S. PATENT DOCUMENTS

| | | | |
|---|---|---|---|
| 3,856,989 | 12/1974 | Weimer | 358/213 |
| 3,904,818 | 9/1975 | Kovac | 358/213 |
| 4,145,721 | 3/1979 | Beaudouin et al. | 358/213 |
| 4,167,754 | 9/1979 | Nagumo et al. | 358/167 |
| 4,179,711 | 12/1979 | Nagumo | 358/213 |
| 4,200,934 | 4/1980 | Hofmann | 364/571 |
| 4,237,488 | 12/1980 | Takemura | 358/163 |
| 4,240,103 | 12/1980 | Poetsch et al. | 358/167 |
| 4,343,021 | 8/1982 | Frame | 358/213 |
| 4,392,157 | 7/1983 | Garcia et al. | 358/213 |
| 4,499,547 | 2/1985 | Inuiya et al. | 358/213 X |
| 4,558,366 | 12/1985 | Nagumo | 358/213 |
| 4,589,025 | 5/1986 | Monahan et al. | 358/213 |
| 4,600,946 | 7/1986 | Levine | 358/213 X |
| 4,602,291 | 7/1986 | Temes | 358/213 X |
| 4,660,082 | 4/1987 | Tomohisa et al. | 358/163 |

FOREIGN PATENT DOCUMENTS 0140266  10/1984  European Pat. Off.

Primary Examiner—Felix D. Gruber
Attorney, Agent, or Firm—Eugene M. Whitacre; Paul J. Rasmussen; James B. Hayes

[57] ABSTRACT

A defect corrector for a solid-state imager having a number of defective pixels less than the total number of pixels in the imager in which only defect correction signals associated with the defective pixels are generated. The defect correction signals are then combined with photoresponse signals from the corresponding defective pixels, so as to provide a defect compensated photoresponse signal for each of the defective pixels.

13 Claims, 3 Drawing Sheets

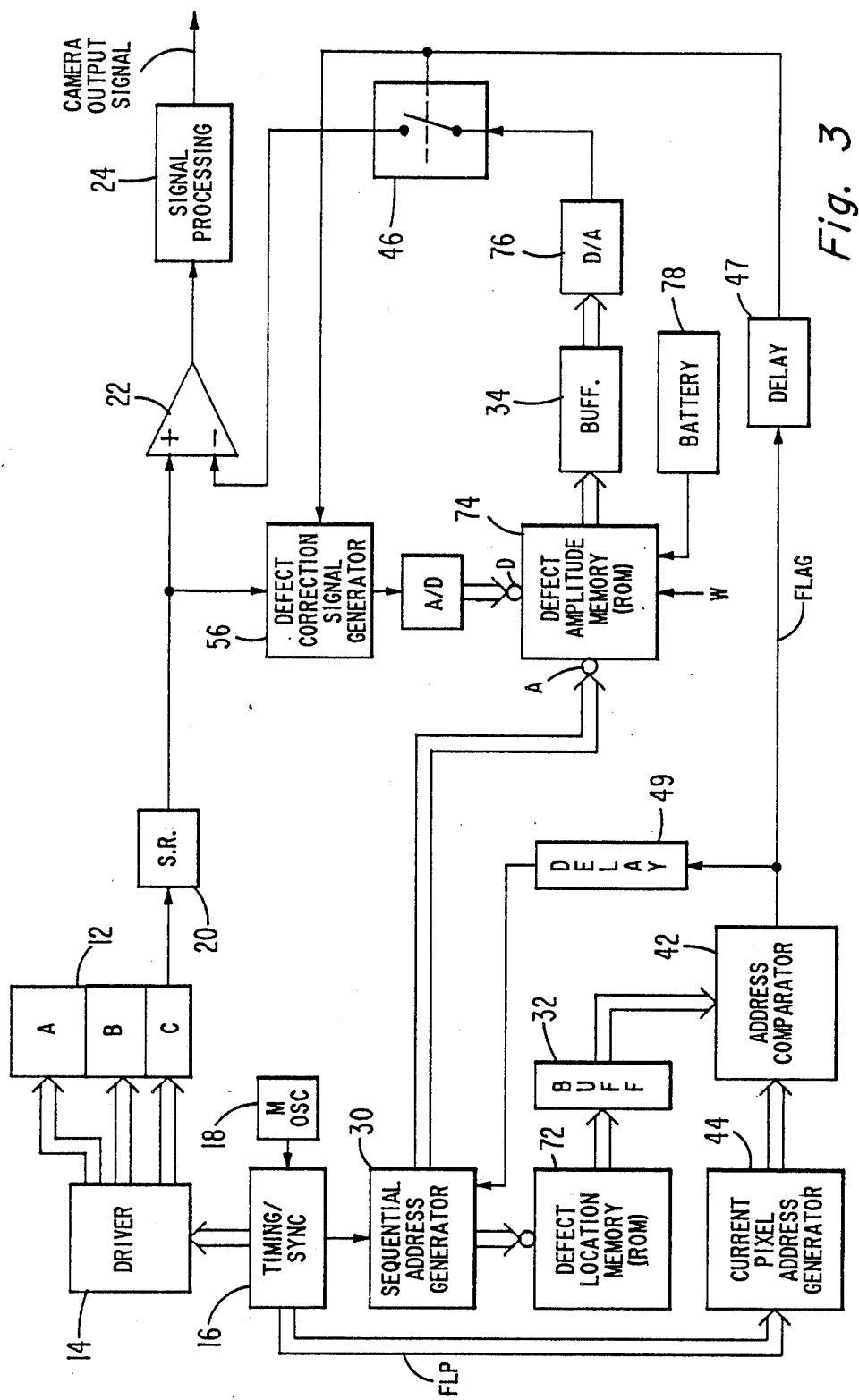

SOLID-STATE IMAGER DEFECT CORRECTOR

FIELD OF THE INVENTION

The present invention relates to defect correction apparatus for solid-state imagers which include defective photosensitive elements.

BACKGROUND OF THE INVENTION

Solid-state imagers are finding increased use in cameras for detecting radiant energy in the visible and infrared light range due to their long life, low power consumption and small size, as compared with conventional image pick-up tubes. Solid-state imagers include an imaging area comprising an array of discrete photosensitive picture elements (pixels) for responding to light from a scene. Typically, solid-state imagers which are suitable for use in television cameras, such as the x-y addressed MOS field-effect transistor type or the self-scanned CTD (charge transfer device) type, have up to 200,000 pixels. Because of random non-uniformities in semiconductor substrate material from which the solid-state imagers are fabricated, and impurities and/or imperfections introduced during the manufacturing process, the manufacturing yield of solid-state imagers having acceptable imaging response characteristics for each pixel decreases substantially as the number of pixels in the imager increases. For example, one type of imaging response characteristic for a solid-state imager is dark current response. It is well known that semiconductor devices exhibit a certain amount of leakage current. In a solid-state imager, the leakage current may result in the collection of a charge in a pixel even in the absence of photo-excitation and is known as the dark current response. When solid-state imagers are used in television cameras, the dark current (nonimage-representative) response of each pixel must be relatively low as compared to its image-representative photoresponse so as to allow television signals to be generated with an acceptable signal-to-noise ratio. However, if the dark current response for a particular pixel is higher than the average level of its surrounding pixels, it will show up as a "white spot" defect in the generated television signal. Alternatively, a pixel can cause a "black spot" defect in a television signal as a result of impurities and/or imperfections introduced during the manufacturing process of the imager. Because of defects like these, the manufacturing yield of solid-state imagers having a large number of pixels, such as those suitable for high quality television cameras, is quite low. Thus, each imager must be carefully tested to screen out those with defects and a high cost is associated with the relatively few imagers which are found to be acceptable.

One way of using such imperfect imagers in a television camera, thereby increasing the number of usable imagers and consequently lowering their cost, is to include a defect corrector in the camera. For example, U.S. Pat. No. 4,179,711, filed in the name of Nagumo, shows a camera wherein a CCD (charge coupled device) imager and a frame memory loaded with defect location information are synchronously clocked. When the defect location memory indicates a signal from a defective pixel is being supplied by the CCD, the signal from a prior pixel is substituted in its place. This type of correction, commonly called "substitution", is generally not desirable for use in high quality television cameras because the substituted signal is clearly visible as being erroneous when viewing a test pattern or a scene having fine detail. Additionally, a large memory is required to store the address of each pixel for identifying which ones are defective, thereby increasing the size, cost and power consumption of the defect corrector.

U.S. Pat. No. 4,200,934, filed in the name of Hofmann, is illustrative of another type of image defect corrector and includes a frame memory for storing the amplitude of the dark current for each pixel of the solid-state imager. The imager and frame memory are then synchronously clocked and dark current amplitudes stored in the frame memory are subtracted from the signals supplied by respective pixels of the imager. This results in an image-representative signal which is substantially free from nonimage dark current variations, as long as each stored dark current amplitude is smaller than the highest possible variation signal for the respective pixel and sufficient signal capacity (headroom) is left for accurately responding to the incident light. This system is advantageous over the substitution method since the correction can be virtually undetectable in a displayed image. However, a full frame of memory is required for storing the amplitude of the dark current for all the pixels of the imager. For example, assuming there are 200,000 pixels and 6 bits per pixel are required to store the dark current amplitude, a memory having over one million storage locations (i.e., bits) will be required. This memory presents a substantial size, cost and power consumption burden as compared with the above-noted substitution technique, especially if the camera includes several imagers requiring defect correction.

Therefore, it is desirable to provide defect correction for solid-state imagers in order to increase the supply of imagers which are suitable for television cameras and, in a manner which does not significantly increase the cost or power consumption of the camera.

SUMMARY OF THE INVENTION

In accordance with the principles of the invention, in a defect corrector for a solid-state imager which includes a number of defective pixels less than the total number of pixels in the imager, only defect correction signals associated with the defective pixels are generated. These defect correction signals are then combined with the photoresponse signals from the corresponding defective pixels, so as to provide a defect compensated photoresponse signal for each defective pixel.

BRIEF DESCRIPTION OF THE DRAWING

FIG. 3 illustrates, in block diagram form, an alternative embodiment of a defect corrector constructed in accordance with the principles of the invention.

DESCRIPTION OF THE PREFERRED EMBODIMENTS

Figure 1:
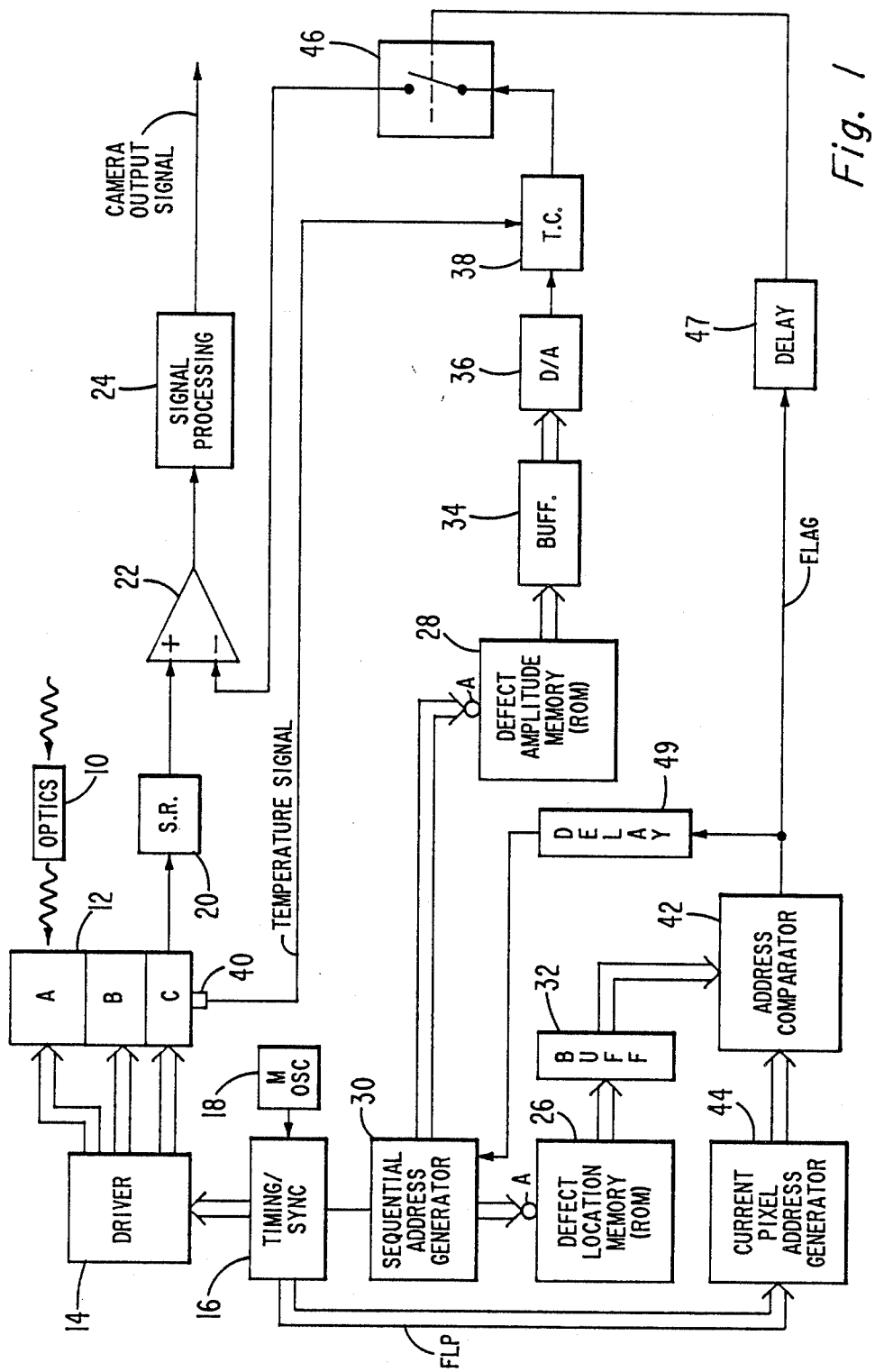
FIG. 1 illustrates, in block diagram form, a television camera including a solid-state imager defect corrector constructed in accordance with the invention.

In the camera of FIG. 1, optics 10 directs light, illustrated by a wavy arrow, from a scene onto the photosensitive imaging area of a solid-state imager 12. Imager 12 may comprise any one of several commonly used solid-state imaging devices, such as an x-y addressed MOS imager or a self-scanned CTD (charge transfer device) imager. In the illustrated embodiment, imager 12 comprises a frame transfer CCD (charge coupled device) imager, such as the SID504 frame transfer CCD imager available from RCA Corporation. Briefly, a frame transfer CCD imager comprises a semiconductor substrate including a plurality of electrodes disposed over a substrate insulating layer and selectively doped regions for forming an imaging area (A register) including an array of photosensitive picture elements (pixels) for developing a charge pattern in response to incident light from the scene, a charge transfer area (B register) masked from incident light for storing the charge pattern developed in the A register, and a readout area (C register) for reading out electrical signals corresponding to the developed charge pattern. A driver stage 14, including level shifting and amplifying stages as well known, supplies level shifted and amplified versions of multiphase clock signals developed by a timing and synchronization (sync) circuit 16 in response to pulses from a master oscillator 18 to the electrodes in the A, B and C registers of imager 12. The construction and operation of CCD imagers is well known to those skilled in the art, therefore, further detailed description of imager 12 is unnecessary.

The electrical signal produced at the output of the C register supplies an imager output signal to a signal recovery circuit 20, which may comprise, for example, a well known correlated double-sampling circuit. The signal from signal recovery circuit 20 is supplied to the noninverting (+) signal input of a differential amplifier 22. As will be described in greater detail below, if a particular pixel is defective, a defect correction signal is supplied to the inverting (−) signal input of amplifier 22 during the time period in which the electrical signal at the noninverting (+) signal input of amplifier 22 corresponds to the defective pixel. A defect-corrected signal is produced at the output of amplifier 22 and processed by signal processing circuits 24, which may include gamma correction, white and black balance and synchronization signal insertion, etc. for developing a conventional television signal. Since only the correction signals (i.e., amplitude levels) of defective pixels need be generated, significant savings are realized in the amount of circuitry and power consumption required for the defect corrector as will become clear from the description below.

More specifically, the present defect corrector includes a defect location memory 26 including a nonvolatile ROM (read only memory) having stored therein address information for identifying the location of each of the defective pixels to be corrected. The address information may comprise a block of bits. By way of example, the block may include 18 bits, the first bit indicates if the television field including the defect is odd or even, the next eight bits indicate the television line the defect is located in (eight bits are enough to specify up to 255 lines, which is sufficient for the 242 active television lines per field in the NTSC television system) and the last nine bits indicate the horizontal position of the defect along the television line (nine bits can specify up to 511 positions, which is sufficient for 403 pixels per line such as provided by the RCA SID504 CCD imager). A defect amplitude memory 28 also includes a non-volatile ROM, having stored therein a block of information relating to the defect amplitude level for each defective pixel to be corrected. For example, if the defect to be corrected is a white spot defect, the amplitude level of that portion of the dark current for the defective pixel which is greater than (i.e., exceeds the reference level of) the average pixel dark current of its neighbors, is stored in memory 28 in a block of locations (6 bits is sufficient) as a defect correction signal for that defective pixel.

A sequential address generator 30 provides addressing signals to defect location memory 26 and defect amplitude memory 28. For each address represented by the addressing signals, an 18-bit defect address is read out of defect location memory 26 and stored in a buffer register 32 and a corresponding 6-bit defect correction signal is read out of defect amplitude memory 28 and stored in a buffer register 32. Each time the camera is turned on, timing and sync circuit 16 provides a frame-rate signal to sequential address generator 30 which causes it to provide addressing signals to memories 26 and 28 for reading out their first block of information relating to the first pixel defect of the televison frame to be corrected. The digital defect correction signal stored in buffer register 34 is converted by a digital-to-analog (D/A) converter 36 into a corresponding analog defect correction signal. Since dark current levels vary with temperature, a temperature compensation stage 38 modifies the level of the defect correction signal generated by D/A converter 36 in accordance with a temperature representative signal developed by a temperature sensor 40 in thermal contact with imager 12.

An address comparator 42 receives the defect address from buffer register 32 at one of its input ports and receives at its other input port addressing signals from a current pixel address generator 44 which represent the address of the pixel currently being read out from imager 12. Current pixel address generator 44 includes field rate (F), line rate (L) and pixel rate (P) counters responsive to F, L and P signals provided by timing and sync circuit 16 for generating the current pixel address, as well known by those skilled in television circuitry. When the current pixel address coincides with the defect address stored in buffer register 32, a flag signal is generated at the output of comparator 42. In response to the flag signal, a gate 46 is caused to couple the temperature compensated defect correction signal to the inverting (−) input of amplifier 22 during the time period when the signal derived from the first defective pixel is being coupled to the noninverting (+) input of amplifier 22. Amplifier 22 subtracts the defect correction signal from the imager supplied signal derived from the first defective pixel, resulting in a signal supplied to camera signal processing circuits 24 which corresponds substantially to only the image-representative photoresponse for the defective pixel. Signal processing circuit 24 may also include a sampling circuit at its input for resampling the defect corrected signal so as to eliminate switching signal transients at pixel edges caused by gate 46, as is well known. The flag signal is also applied to sequential address generator 30 for causing it to supply new addressing signals to memories 26 and 28, thereby causing the next defect address and defect correction signal for the next defective pixel to be loaded into buffers 32 and 34, respectively, after the completion of the defect correction for the prior pixel. Depending upon the actual construction of the defect correction apparatus, it may be found necessary to delay the application of the flag signal to gat 46 and sequential address generator 30 via delays 47 and 49, respectively, in order that the timing of the above-described operation occurs properly.

Figure 2:
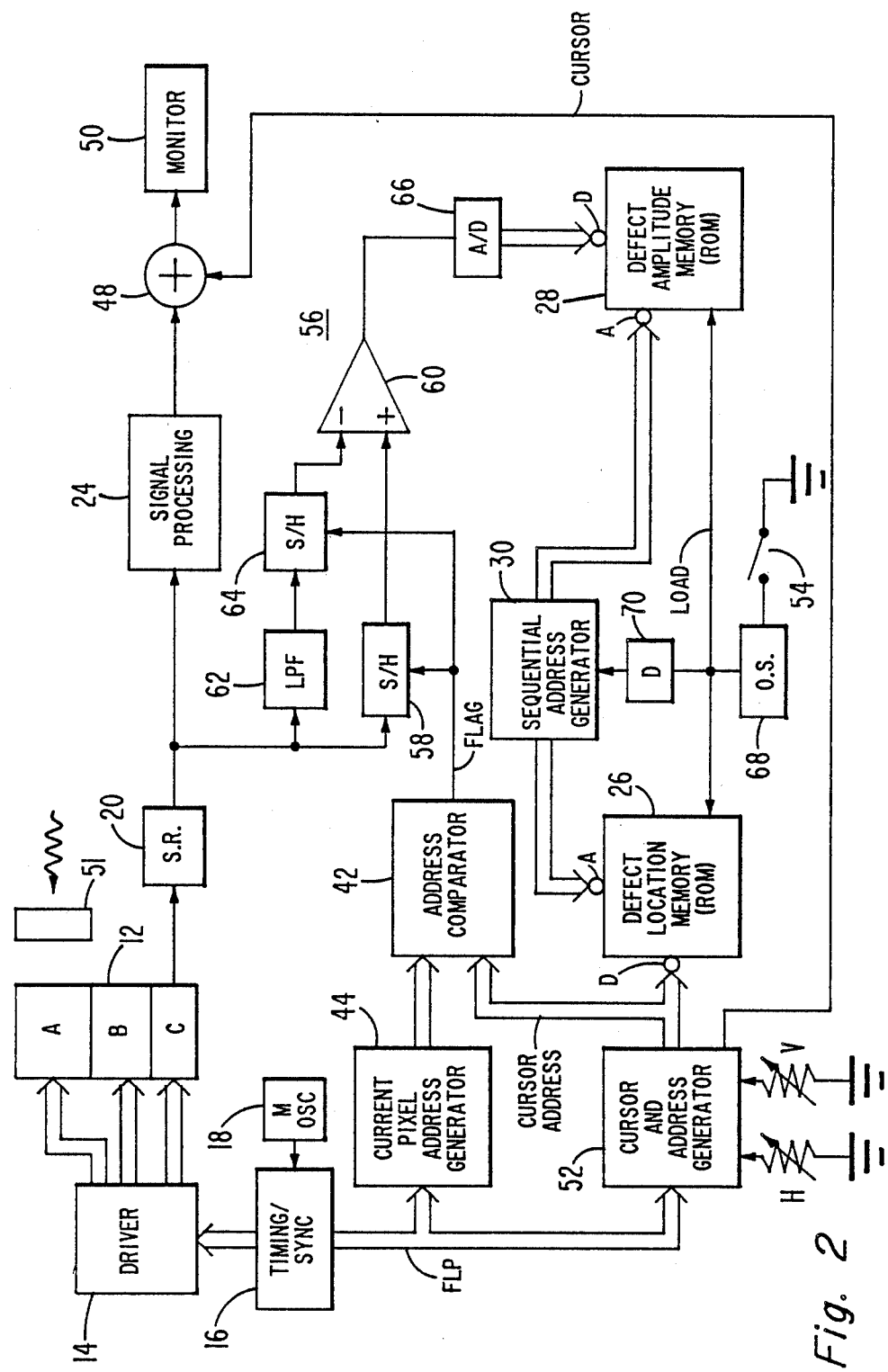
FIG. 2 illustrates, in block diagram form, apparatus for determining the location and amplitude level of defects in a solid-state imager which may be used in conjunction with the defect corrector shown in FIG. 1.

Prior to assembly of the camera, i.e., during camera manufacture, defect location memory 26 and defect amplitude memory 28 must be loaded with the defect address and defect amplitude information for the defective pixels. In FIG. 2, wherein elements similar in construction and operation to those described with respect to FIG. 1 are identified by the same reference number, apparatus for loading the defect address and defect amplitude information into memories 26 and 28 is illustrated. Firstly, only imagers having defects which are suitable for use in conjunction with the FIG. 1 defect corrector are used, e.g., if the defects are white spots they are small enough that sufficient signal capacity (headroom) is available for accurately developing an image-representative photoresponse for each defective pixel. Basically, in the arrangement of FIG. 2, the video signal from signal processing circuits 24 is applied via a summer 48 to a monitor 50 where it is reproduced. A shutter 51 is positioned in front of the photosensitive A register of imager 12 so as to substantially block all light from reaching the photosensitive pixels, thereby enabling an operator to view e.g., dark current defects such as white spots on monitor 50. The operator views monitor 50 while adjusting the position of a cursor generated by a cursor and address generator 52 until the position of the cursor is aligned on monitor 50 with a defective pixel. Once aligned, the operator depresses a switch 54 which causes loading of the 18-bit address for the defective pixel, as identified by the curser and address generator 52, into the ROM of memory 26 and loads into the ROM of memory 28 the 6-bit digital correction signal which is generated by a defect correction signal generator 56. This process is repeated until defect address and correction signals are sequentially stored in memories 26 and 28, respectively, for each defect to be corrected.

More specifically, cursor and address generator 52 includes counters responsive to the F, L and P signals for generating the cursor signal, which is added to the imager generated video signal via summer 48. Additionally, cursor and address generator 52 simultaneously generates an 18-bit address representative of the current cursor position which is applied to address comparator 42 and the data (D) input of defect location memory 26. After the operator adjusts horizontal (H) and vertical (V) controls associated with cursor and address generator 52 so as to position the cursor so that it is coincident with the first defect to be corrected, the 18-bit cursor address supplied to memory 26 corresponds to the 18-bit address of the defective pixel. Furthermore, comparator 42 compares the cursor address signal with the current pixel address from address generator 44 for generating a flag signal each time the addresses are coincident. The flag signal is applied to a sample-and-hold circuit 58 for sampling the dark current level of the defective pixel. The sampled level is applied to the noninverting (+) input of a differential amplifier 60. A lowpass filter 62 has a relatively long time constant (e.g., 30 pixels) for developing signal at its output representative of the average dark current of the neighboring pixels which precede the defective pixel. A sample-and-hold circuit 64, also responsive to the flag signal, samples the output of lowpass filter 62 and applies the average dark current signal as a reference level to the inverting (−) input of amplifier 60. The difference signal developed at the output of amplifier 60 corresponds to the defect correction signal and represents the deviation of the dark current for the defective pixel from the average dark current of its neighboring pixels. The defect correction signal is then digitized by an A/D converter 66 into a 6-bit digital signal which is applied to the D input of memory 28. Thus, after the operator has set the curser to be coincident with the first defect to be corrected, the FIG. 2 apparatus described so far supplies the defect address and defect correction signals for the first defect to be corrected to the D inputs of memories 26 and 28.

The sequential address generator 30 supplies to the address (A) inputs of memories 26 and 28 addressing signals for directing the 18-bit pixel address and 6-bit digital defect correction signal for the first defect into a first block of memory locations in memories 26 and 28. The operator then presses switch 54 which activates a one-shot 68 for generating a LOAD pulse which causes loading of the defect address and digital correction signals into the first block of locations in memories 26 and 28 which are addressed by sequential address generator 30. A delay 70 applies the LOAD signal to sequential address generator 30 for incrementing its addressing signals after completion of the loading of memories 26 and 28, so that new addressing signals are applied to memories 26 and 28 which are representative of the address for the next block of information for the next defect to be corrected. The operator repeats this procedure until defect address and correction information are stored in memories 26 and 28 for each of the defects to be corrected. It should be noted that the amplitude level of the dark current defects are substantially constant as a function of the amount of photoresponse generated charge, thus allowing measurement and storage of pixel defect amplitudes under the above-described capped camera condition which are substantially unchanged after the camera lens cap is removed and the imager responds to incident light.

FIG. 3 illustrates an alternative embodiment to that shown in FIG. 1 which allows the use of slow speed and therefore low power consumption components. Since the number of defects in imagers having correctable defects is typically much less than the total number of pixels in the imager, and the defects are randomly distributed, there is a very low probability of having adjacent defective pixels. By allowing only a wide spacing between pixels to be corrected, e.g., 200 pixels, it is possible to make use of D/A converter and memory circuits having conversion and read times which are almost two orders of magnitude longer than those of the FIG. 1 embodiment. Additionally, in FIG. 3 defect amplitude memory 28 includes a random access memory (RAM) which can be updated with new defect amplitude information while in the camera.

In FIG. 3, elements similar to those already described with respect to FIGS. 1 and 2 are identified by the same reference number. A defect location memory 72 includes a low speed ROM (similar to the ROM of defect location memory 26 of FIGS. 1 and 2, except that it is of a slower operating speed) which is responsive to the addressing signals from sequential address generator 30 for supplying to buffer register 32 the address of the defects to be corrected. A defect amplitude memory 74 including a RAM is also responsive to addressing signals from sequential address generator 30 for sequentially supplying to buffer register 34 digital defect amplitude levels corresponding to the defective pixels, the addresses of which are stored in memory 72. A slow speed D/A converter 76 converts the digital defect amplitude levels to corresponding DC levels which are applied to gate 46, as in FIG. 1, however D/A converter 76 can operate at a much slower speed since there are at least 200 good pixels between the occurrence of each defective pixel. Memory 72 operates in conjunction with elements 30, 32, 44 and 42 for developing the flag signal which causes conduction of gate 46 and defect correction of the imager supplied signal applied to the + input of amplifier 22, in the same manner as previously described with respect to FIG. 1.

Additionally, to allow periodic updating of the defect amplitude information stored in memory 74, the defect correction signal generator 56 and A/D converter 66 of FIG. 2 are coupled to the output of signal recovery circuit 20 for generating digital defect correction signals which are applied to the D input of memory 74. During the updating, imager 12 is blocked from receiving incident light, for example by capping its lens (not shown), and a write (W) signal is applied to a read-/write input of memory 74 to cause the digital defect correction signals applied to its D input to be stored. The write signal can be automatically generated by a switch activated by the capping of the lens. Since the RAM of memory 74 is volatile, a backup battery 78 is provided so that the most recent defect amplitude information is not lost each time the camera is turned off and its operating power is removed. This embodiment is particularly advantageous since it allows recent defect amplitude information to be loaded into memory 74, thereby automatically storing defect amplitude information which is correct for the present operating temperature and bias conditions of the multiphase clock (clock bias conditions also effect the dark current levels in imager 12). Thus, in some applications temperature compensation circuitry may not be required. Alternatively, if an even more accurate defect correction is desirable, temperature compensation circuitry similar to that used in FIG. 1 could be included so that each time new defect amplitude information is loaded into memory 74 the temperature compensation circuit would modify the defect amplitude level accordingly.

It should be noted that although defect amplitude memory 28 of FIG. 1 is described as including a ROM, it should be clear that a capacitor array could be used for storing the defect amplitude signals as analog values, thereby eliminating the requirement for a D/A converter. Additionally, it is possible to detect the location of defective pixels by examining the contrast characteristics of adjacent pixels in real time, "on-the-fly", such as described in my U.S. Pat. No. 4,253,120. Thus, defect location memory 26 (or 72) buffer register 32, address comparator 42 and current pixel address generator 44 of FIGS. 1 or 3 could be eliminated. These and other modifications are considered to be within the scope of the following claims.

What is claimed is:

1. Imaging apparatus, comprising:
    solid state imaging means including an array of photosensitive elements for providing image-representative signal including nonimage-representative signal components, said photosensitive elements include a certain group of member elements, less in number than the total number of photosensitive elements in said array, having nonimage-representative signal component amplitudes which deviate by at least a given amount from a reference level;
    means providing a pluarlity of element location signals which identify the locations in said array of members of said certain group of photosensitive elements;
    means providing respective correction signals for member photosensitive elements in said certain group, said correction signals having an amplitude related to the deviation of the nonimage-representative signal components from said reference level;
    means responsive to said image-representative signals and said element location signals for combining respective ones of said correction signals with corresponding image-representative signals identified by said element location signals in a manner to provide an output signal compensated for the deviation of said nonimage-representative signal components of said certain group of photosensitive elements; and
    means responsive to said nonimage-representative signal components of said array and said element location signals for periodically updating the amplitude of said correction signals.

2. The imaging apparatus according to claim 1 wherein: said means for providing said correction signals includes a reprogrammable memory means having an information input and said correction signal updating means includes a correction signal generator coupled between an output of said solid state imaging means and the said information input of said memory means.

3. The imaging apparatus according to claim 2 wherein: said memory means is a digital memory, analog-to-digital converter means coupled between said correction signal generator and said memory information input, and digital-to-analog converter means coupled between an output of said memory means and said signal combining means.

4. The imaging apparatus according to claim 3, in which the nonimage-representative elements of said certain group are widely spaced about said array, wherein said memory and said analog-to-digital converter means have operating times on the order of two orders of magnitude slower than an imaging apparatus in which said elements of said certain group are closely spaced.

5. The imaging apparatus according to claim 2 wherein: said correction signal generator includes means for providing respective correction signal outputs representative of the difference between the magnitude of the nonimage-representative signal component of given ones of the photosensitive elements of said certain group and the average magnitude of the nonimage-representative signal components of the other photosensitive elements of said array.

6. The imaging apparatus according to claim 5 wherein: said means providing correction signal outputs includes a signal difference circuit having first and second inputs and an output coupled to said memory means, respective first and second signal sampling means coupled to said first and second inputs of said difference circuit, and one of said signal sampling means including filter means for providing an average of the nonimage-representative components of photosensitive elements preceding a given one of said certain group of photosensitive elements.

7. The imaging apparatus according to claim 1 wherein: said means for updating said correction signals includes means for preventing light from being received by the photosensitive elements of said array.

8. Apparatus according to claim 1 wherein:

each one of said nonimage-representative signal component amplitudes of said certain group of photosensitive elements has an amplitude level which deviates from an average amplitude level of nonimage-representative signal components from other photosensitive elements in said array; and respective ones of said correction signals have an amplitude level representative of said respective deviations.

9. Apparatus according to claim 8 wherein:

said nonimage-representative signal components substantially comprise a photosensitive element dark current response; and said average amplitude level corresponds to the average amplitude of the dark current response of photosensitive elements which neighbor photosensitive elements of said certain group.

10. Apparatus according to claim 1 wherein:

said combining means subtracts said correction signal from said imager-representative signal for each photosensitive element of said certain group.

11. Apparatus according to claim 1 wherein said combining means comprises:

a difference circuit having a first input responsive to the output of said imaging means; and a gate having an input coupled to receive said correction signals, an output coupled to a second input of said difference circuit and a control input coupled to receive said element location signals for selectively controlling the conduction of said gate.

12. Apparatus according to claim 1 further including:

means for providing a temperature signal identifying the present temperature of said imaging means; and said means for sequentially providing said correction signal is responsive to said temperature signal for causing said correction signals to vary in accordance with variations in the present temperature of said imaging means.

13. Apparatus according to claim 1 wherein said means for providing said element location signals comprises:

a location memory having data stored therein representative of the location of said photosensitive elements in said group;

reading means coupled to said location memory for causing the data corresponding to respective photosensitive elements to be sequentially read out;

a source of at least one clock signal coupled to said imaging means for causing said imaging means to sequentially supply samples corresponding to respective photosensitive elements of said array from which said image-representative signal is derived;

counter means responsive to said clock signal for operating synchronously with said imaging means so as to provide signals representing the locations of the photosensitive elements corresponding to the sequentially supplied samples; and a comparator responsive to said data read out from said location memory and said location representative signals from said counter means for developing said element location signals when said data read out from said location memory and one of said location representative signals correspond to the same photosensitive element, said reading means being coupled to said comparator and being responsive to the generation of said element location signals for incrementing said sequential readout of said location memory.

* * * * *